Sept. 21, 1943.  J. R. SOFFNER  2,330,086
REEL FOR ELECTRIC CABLES
Filed July 12, 1941
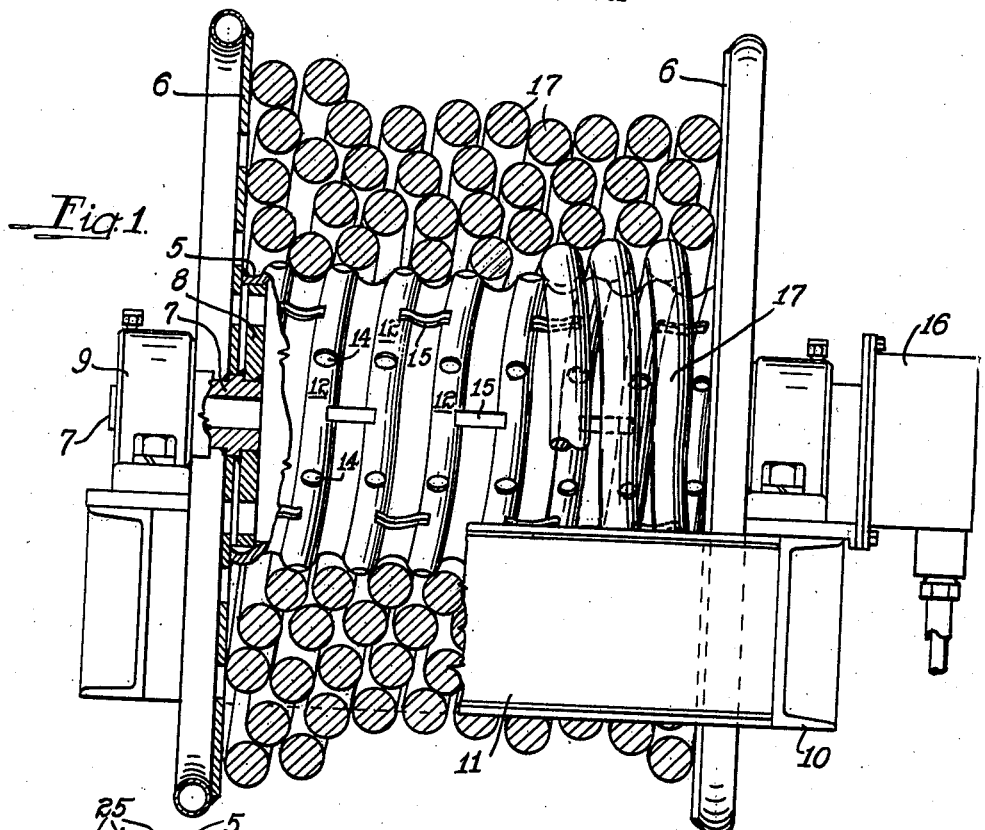
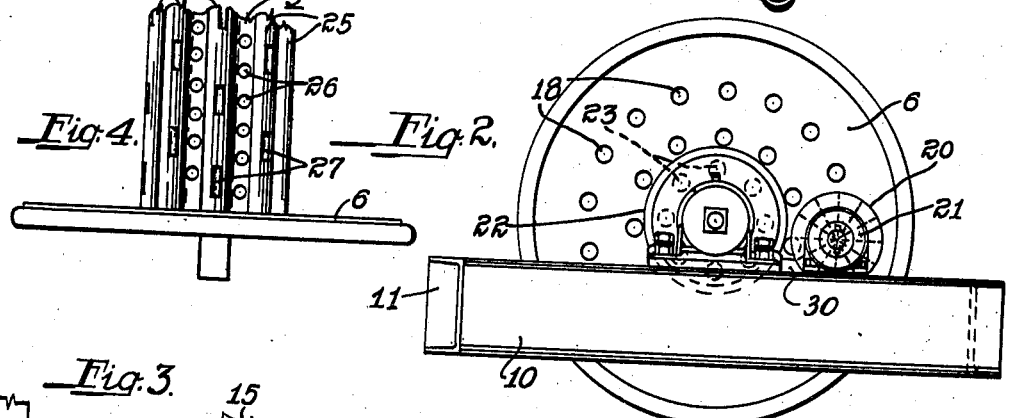
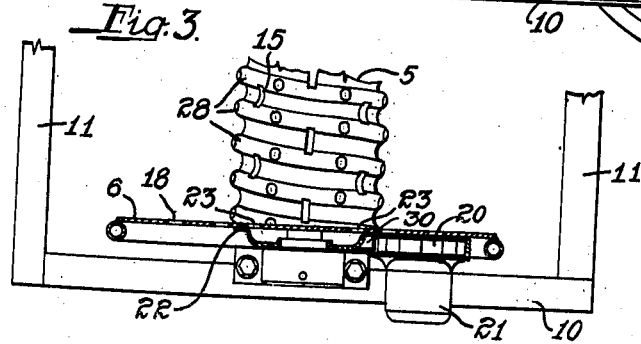
INVENTOR
John R. Shoffner
By Green & McCallister
His Attorneys Patented Sept. 21, 1943

2,330,086

UNITED STATES PATENT OFFICE 2,330,086

REEL FOR ELECTRIC CABLES

John R. Shoffner, Kittanning, Pa.

Application July 12, 1941, Serial No. 402,107

4 Claims. (Cl. 34—153)

This invention relates to cable reels such, for example, as are employed on or in association with electrically operated apparatus which is adapted to be moved and operated in different positions more or less remote from the reel.

An object of my invention is to provide a ventilated spool for such a reel so arranged as to dissipate such heat as may be generated in the cable by the passage of electric current therethrough, and even under conditions where a number of layers of cable encircle the spool.

A further object is to provide a cable reel assembly including a ventilated spool and a motor driven fan for creating a forced circulation of air through the coils of cable located on the reels.

These and other objects are attained by means of apparatus embodying the features herein described and illustrated in the drawing accompanying and forming a part hereof.

Figure 1 is a diagrammatic view, partially in side elevation and partially in section, of a cable reel embodying my invention with coils of cable in place thereon; portions of the support for the spool are shown as if broken away and portions of the cable are shown in fragmental elevation, for convenience of illustration.

Figure 2 is an end elevation, on a reduced scale, of a cable reel and support equipped with a motor driven fan or blower for forcing air through the ventilating passages of the spool of the reel.

Figure 3 is a fragmental plan view of the apparatus shown in Figure 2.

Figure 4 is a fragmental plan view and illustrates a modified form of spool.

One of the features of the invention is to provide a cable reel assembly which is so arranged as to insure a substantially free flow of air around and through the coils of cable located thereon. The spool constituting a part of the reel assembly is, therefore, provided with means for minimizing the amount of contact between cable and spool and with air delivery apertures so located and arranged as to create or contribute to a flow or circulation of air between and around the separate coils or layers of cable wound onto the spool. This is accomplished, in the illustrated embodiments, by providing cable supporting ridges on the peripheral face of the spool so arranged that each ridge is crossed by the coils of cable supported thereon and by also providing the spool with air delivery apertures which are so located with relation to the ridges that they create or contribute to a circulation of air along the ridges and around the coils or strands of the portion of the cable coiled on the spool.

As disclosed in Figure 1, the cable reel includes a spool which is made up of a substantially cylindrical hollow drum 5, circular end plates or flanges 6 secured to the drum, and axially projecting spindles 7, each of which is secured to one of the flanges 6 and to a head 8 which lies adjacent to a flange and is so secured to the drum 5 as to constitute a head for the drum. Each spindle 7 is shown mounted in a bearing 9 and each bearing is carried by a support constituting a part of the reel assembly.

In the drawing, the support is more or less diagrammatically shown as made up of structural steel members 10 and 11 assembled to form a rectangular frame. Each of the bearings 9 is carried by one of the support members 10 and the spool bridges the space between these members and is located within the rectangular frame.

In the embodiment of my invention shown in Figure 1, the spool 5 is corrugated to provide cable supporting ridges 12 which extend around the spool. As a matter of fact, the corrugations may be so formed as to provide a single spiral rib 12 which extends around the spool at such a pitch as to provide a spacing between the separate turns equal to or somewhat less than the diameter of the cable to be coiled on the spool. This spiral rib produces, in effect, a plurality of spaced ridges which extend around the drum in spaced relation to each other.

As shown, the drum portion of the spool is provided with two sets of apertures 14 and 15 so located as to insure air circulation through all parts of the cable coiled on the reel. The apertures 14 are located in spaced relation along the top of the ridges 12, whereas the apertures 15 are located in the portion of the spool constituting the spaces between the ridges, although the apertures 15 are preferably so formed that they extend into the metal forming the base or lateral portions of the ridges.

It will be understood that the reel assembly is provided with the usual junction box 16, or its equivalent, for delivering electric current to the cable 17 and that the junction end of the cable 17 will pass through a suitable aperture formed in the drum and will be effectively secured to the drum so as to relieve the junction box and its connections of strain when the cable is completely unwound from the reel and subjected to a pull.

As shown in Figure 1, the spiral rib 12 extends across the peripheral face of the drum in a direction opposite to that of the spiral resulting from coiling the initial layer of cable on the spool. With such an arrangement, the individual coils of the cable next to the drum extend at an angle to their supporting ridges 12 and, in effect, have point contact with those ridges. As a result, the cable 17 does not enter the spaces between the ridges and is, therefore, prevented from totally blocking off or closing any of the apertures 15.

In addition, by winding the cable onto the reel so that the spiral of cable laid thereon extends across the supporting rib or ridges 12, there is little or no tendency for the ridge apertures 14 to be totally blocked off or closed by the successive turns of cable. It will also be apparent that, even though adjacent coils of the cable contact each other throughout the length of each turn, the arrangement of ribs and air apertures is such as to provide adequate air passages around the drum 5 and between it and the coils of cable 17 laid thereon. This insures air circulation along the entire length of cable coiled on the spool, because the coiling of the cable onto the spool tends to produce a number of spiral passages which extend throughout the mass of coiled cable, and each of these passages communicates with one or more of the air delivery apertures 14 and 15.

In addition to providing air delivery apertures in the drum 5, I preferably provide air passages or apertures 18 in each of the end flanges 6. This contributes to a free flow of air throughout all portions of the coil of cable.

In Figures 2 and 3, I have illustrated a reel assembly, similar to that disclosed in Figure 1, which is provided with means for accomplishing forced ventilation. As shown, a fan 20 and a driving motor 21 are operatively connected together and are mounted on one of the supports 10 so that the fan casing lies immediately adjacent to one of the end flanges 6. A manifold 22 is carried by the support, is secured to the casing of the fan 20 and overlies a portion of the end flange 6 in the region of the mounting spindle 7. In addition, the peripheral edge of the manifold lies snugly against and in close but sliding contact with the flange 6 and forms with it an air delivery chamber which is in open communication with the outlet port of the fan or blower 20. A reference to Figures 2 and 3 of the drawing will disclose that the diameter of this air delivery chamber is approximately equal to the internal diameter of the drum 5 and that apertures 23 formed in the end plate or flange 6 establish communication between the interior of the manifold and the interior of the drum, thus delivering the air under pressure from the fan through a passage 30 and manifold 22 to the interior of the drum and thence through the apertures 14 and 15 to the air passages located between the separate turns of the cable on the drum and formed by coiling the cable on the drum.

Figure 4 is a fragmental plan view of a spool which constitutes a part of a cable reel and in which a different arrangement of cable-supporting ridges are employed from that illustrated in Figure 1. As illustrated, the spool 5 is provided with axially extending parallel ridges 25 which may be pressed or otherwise formed in the metal of the spool or which may be separately formed and secured to the spool by welding or otherwise.

Like the spool illustrated in Figure 1, the spool of Figure 4 is provided with a series of air delivery apertures 26 which correspond to the apertures 15 from the standpoint of function and location. That is to say, they are located between the ridges of the spool, communicate with the interior of the spool and are for the purpose of insuring air circulation through the mass of cable coiled upon the spool. As in Figure 1, the ridges 25 are so located that each strand or coil of cable wound upon the spool crosses each of its supporting ridges. In addition, each of the ridges 26 may also be provided with air delivery apertures 27 corresponding to the apertures 14 of Figure 1 in location and function. It will, however, be noted that the apertures 27 differ from the apertures 14 in that they are oblong and rectangular instead of circular. The apertures 26 also differ in shape from the apertures 15 in that they are circular instead of rectangular and in that they do not extend into the metal of which the ridges 25 are formed.

In Figure 3, the coil-supporting ridges 28 are similar in appearance to the ridges 12 of Figure 1. They, however, may be considered as a number of parallel ridges formed in the metal of the spool and so located that the apex periphery of each such ridge or ring defines a geometric plane which extends at an angle, other than a right angle, to the axis of the spool. Here again, the location and arrangement of the ribs or ridges 28 are such that each turn of the cable next adjacent to the spool crosses its supporting ridges and is thus prevented from entering the depressions between the ridges. As in Figure 1, the spool of Figure 3 is provided with air delivery apertures 14 and 15.

While I have disclosed a motor driven fan or blower as forming a part of the reel assembly, it will be understood that such a detail is not necessary to the successful functioning of a spool embodying my invention. That is to say, while the motor driven fan or blower is preferably employed with the ridged and perforated drum illustrated as a detail of my invention, nevertheless such heat as is generated in the mass of cable coiled on the drum will set up and maintain a circulation of cooling air around the overlapping coils of cable wound onto the drum where apertures and ridges, such as I have illustrated, are provided. For this reason, a ventilated spool such as is illustrated will contribute to the dissipation of heat from the cable coiled thereon, even though a fan or blower is not employed, and will, therefore, minimize the danger of burning or reducing the effectiveness of the insulation for the cable.

While I have illustrated various structural details which may be employed in a reel assembly embodying my invention, it will be apparent that still other changes and modifications may be made in such assemblies without departing from the spirit and scope of my invention as set forth by the appended claims.

Having thus described my invention, what I claim as new and desire to secure by Letters Patent is:

1. In combination in a cable-reel assembly, a frame, a cable supporting spool comprising a perforated drum having cable supporting ribs formed thereon and extending at an angle to the lay of the cable thereon, and end flanges secured to said drum one of which is provided with perforations communicating with the interior of said drum, a supporting spindle secured to at least one of said flanges and means for rotatably mounting said spindle on said frame.

2. In combination in a cable-reel assembly, a frame, a cable supporting spool comprising a drum corrugated to form cable supporting ribs thereon extending at an angle to the lay of the cable thereon and having perforations formed therein along and between such ribs, and end flanges secured to said drum, one of which is provided with perforations communicating with the interior of said drum, and means for rotatably mounting said spool on said frame.

3. In combination in a cable-reel assembly, a frame, a cable supporting spool rotatably mounted on said frame and comprising a drum having ribs formed thereon extending at an angle to the lay of the cable thereon and having perforations formed therein along and between such ribs, and end flanges secured to said drum one of which is provided with perforations communicating with the interior of said drum, means for rotatably mounting said spool on said frame and means causing a flow of air through perforations of one of said end flanges and into said drum.

4. In combination in a cable-reel assembly, a frame, a cable supporting spool rotatably mounted on said frame and comprising a drum having ribs formed thereon extending at an angle to the lay of the cable thereon and having perforations formed therein along and between such ribs, and end flanges secured to said drum one of which is provided with perforations communicating with the interior of said drum, means for rotatably mounting said spool on said frame, a manifold plate carried by said frame and engaging one such flange to form therewith an air delivery passage in communication with the interior of said drum through perforations of said flange and a blower for delivering air under pressure to said passage.

JOHN R. SHOFFNER.